Oct. 8, 1935.  C. HAHN  2,016,940
PROCESS FOR THE DIRECT COOLING OF PRODUCER GAS
Filed June 29, 1931
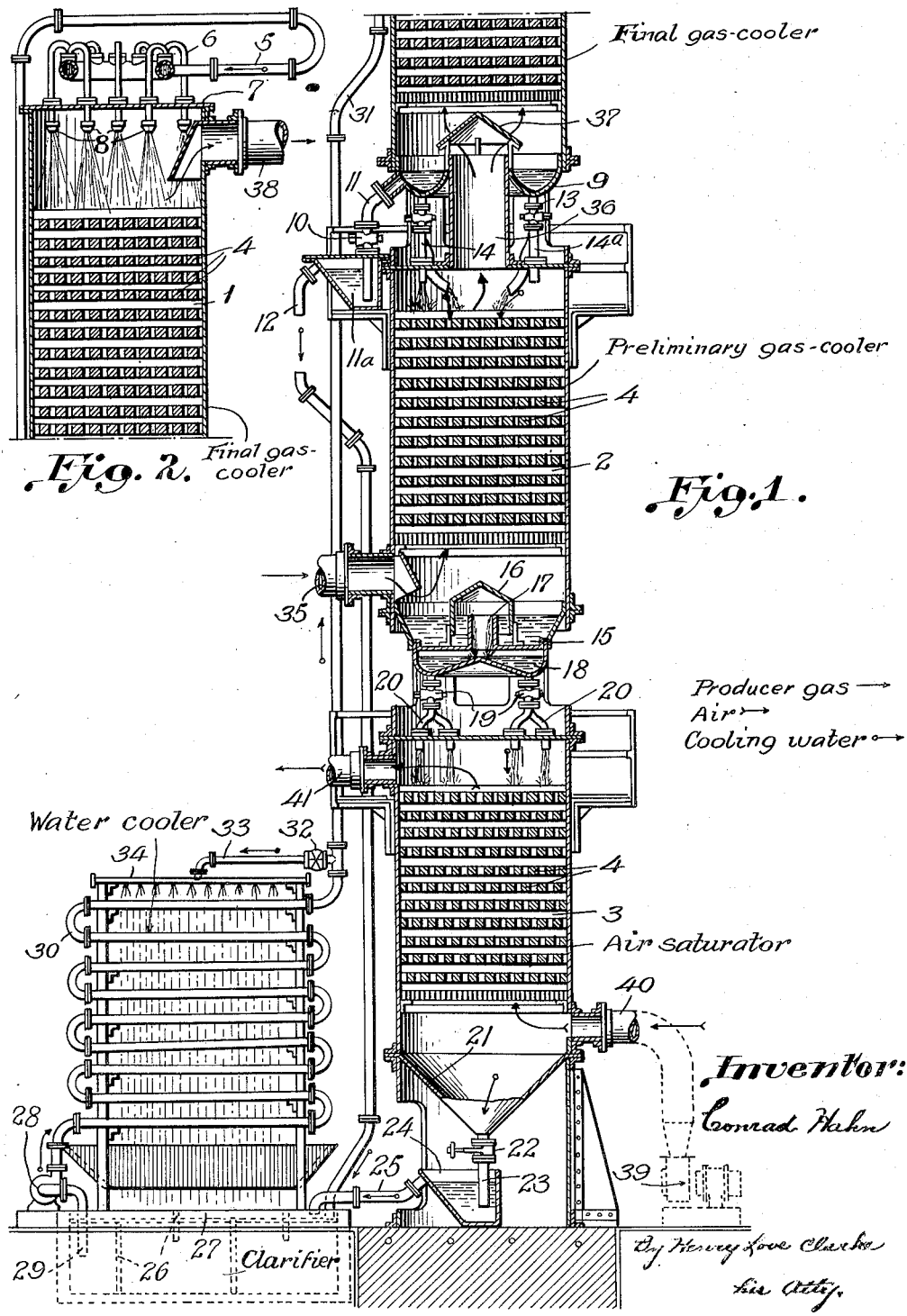
Inventor:
Conrad Hahn Patented Oct. 8, 1935

2,016,940

UNITED STATES PATENT OFFICE 2,016,940

PROCESS FOR THE DIRECT COOLING OF PRODUCER GAS

Conrad Hahn, Essen-Ruhr, Germany, assignor, by mesne assignments, to The Koppers Company of Delaware, Pittsburgh, Pa., a corporation of Delaware Application June 29, 1931, Serial No. 547,771
In Germany June 30, 1930

1 Claim. (Cl. 48—197)

The invention relates to a process and apparatus for the direct cooling of producer gas from coke, lignite or the like, whereby the water used for the direct cooling of the producer gas before being cooled down is used to saturate the combustion gas entering the producer with steam for the purpose of producing water gas inside the producer and more especially to such a process where the cooling down of the gas is effected in two stages whereby the cooling water is brought into contact in counter current with the gas.

The objects of the present invention are improvements in the process indicated by means of which a higher saturation of the combustion air with water is rendered possible whilst at the same time the apparatus for carrying out the process are considerably simplified and cheapened. The process according to the invention consists in carrying out the cooling of the gas in several stages, in the first one of which the gas is cooled only a little and in the last one the gas is cooled down to the desired final temperature whereby for cooling the gas in the preliminary stage such a portion of the water flowing off in the final cooling stage is used so that this portion of the cooling water is heated up to a temperature, which permits a heating up and thorough saturation of the combustion air to be introduced with steam into the producer, when the hot cooling water is finally brought into contact with said combustion air. Further, according to the invention the water running off from the cooler of the final cooling stage and from the air saturator is led off in common to a clarifier for recovering the solid and tarry bodies, which are taken up during the direct cooling of the gas, whereupon the entire cooling water if desired is carried forward again to a cooling contrivance and then to the final cooling stage.

The object of the invention is furthermore apparatus for carrying out the process according to the invention which consists in a washing tower divided up into three or more compartments, the final cooling being effected in the uppermost compartment, the preliminary cooling of the gas in the middle compartment the gas chamber of which is connected up with the upper compartment, and in the bottom compartment the saturation of the air is effected. According to the invention, pipe connections fitted with regulation cocks are provided in this apparatus for carrying forward of a part of the washing liquid from the upper compartment into the lower compartment and further at the bottom of the middle compartment, pipe lines are connected up for transferring the cooling water of the primary stage to the air saturator situated below.

In Figure 1 of the drawing, there is shown in vertical section, apparatus for the carrying out of the process according to this invention, and in Fig. 2 there is shown the upper part of the final gas cooler of Fig. 1.

The apparatus shown consists of a washing tower provided with three compartments 1 to 3 lying above one another. The inside of the compartments 1, 2, and 3 are as customary filled out with wooden hurdles 4 which serve to bring the cooling water into contact with the gases and the air respectively over as large a surface as possible. The cooling water is carried forward by the pipe line 5 to the top compartment 1 which is connected up with a row of distribution pipes 6 which pass through the roof 7 of the washing tower and on the end projecting out in the interior of the compartment 1 sprinklers are fitted for finely dividing up of the cooling liquid. The cooling water sprays over the wooden hurdles in the upper washing compartment 1 and collects in the bottom of the floor 9 of the washing compartment which is divided up into troughs. From there, a part of the cooling water goes forward by means of the pipe line 11 fitted with a cock 10 into an overflow tank 11a serving for the control of the stream of the liquid, from which tank a pipe line 12 is carried forward to the clarifying tank 27 and cooling apparatus 30 for the cooling water.

Another part of the liquid which collects on the floor 9 of the top washing compartment passes through the pipe line 14 and 14a fitted with cocks 13 into the middle washing compartment 2. There it collects again on the floor 15 which has an overflow pipe line 17 covered over by a hood 16 and this overflow pipe opens out into an intermediate receiver 18 provided for under the floor 15, from which a row of distributing pipes 20 provided with a row of cocks 19 project forward into the lower washing compartment 3.

The water in the lower compartment flows again downward over the hurdles collects on the floor 21 of conical shape and flows then from there through a run-off pipe line 23 provided with a cock 22 into a controlling vessel 24.

On the controlling vessel 24 there is arranged a pipe line 25 after the manner of an overflow which carries forward the water to a clarifying tank 27 provided with vertical stemming plates 26. In the receiver 27, the flow of the liquid is slowed down considerably so that any solid and viscous bodies held in the liquid are thrown down to the floor, where they can be separated out from the liquid.

The clarified water is led off by a pump 28 through a pipe line 29 from the clarifying tank and led forward to an indirect tubular cooler 30 which, on the other hand, is connected up by the pipe line 31 with the cooling water supply pipe line 5. A part of the liquid led forward through the tubular cooler 30 is carried forward through the branch pipe line 33 provided with a cock 32 of the connecting pipe line 31 to a spraying contrivance 34 which distributes the water over the entire outer surface of the cooling pipes of the tubular cooler 30. The cooling water runs over these tubes downwards and trickles into the clarifying basin situated below.

The producer gas to be cleaned by the apparatus, according to the invention, is introduced at the lower end of the intermediate washing compartment 2 by means of the pipe line 35. It then passes upwardly over the hurdles 4 in the washing compartment 2 sprayed with water and then leaves the washer compartment 2 at the top by the connecting pipe line 36 the upper opening of which is protected by the hood 37 against the trickling of the cooling water sprayed in the upper washing compartment. The previously cooled producer gas in the compartment 2 passes on then through the final cooler compartment 1 where it is cooled down to the desired temperature. The gas leaves the cooling tower by means of the pipe line 38 on the upper end of the cooling compartment.

The air to be saturated with steam to serve for the gasification of the fuel in the producer is carried forward under pressure by means of the pump 39 through the pipe line 40 into the lower part of the lower washing compartment 3 which serves as an air saturator. In this washing compartment, the air meets the water from the preliminary cooling stage 2 which is comparatively highly heated up so that the combustion air is preheated and is saturated at the same time with the steam. From the washing compartment 3, the combustion air is led off by the pipe branch 41 from which the air is carried forward to the grate of the producer.

In carrying out the process, according to this invention, by making use of the apparatus described herein, the procedure is for example as follows:

Taken, that it is a question of cooling down of gas at about 70° C. to a final temperature of 28° and simultaneously effecting the preheating of the combustion air from 15° up to 50° C. with a corresponding steam saturation. For this purpose, the gas is brought into contact in the final cooling stage, with cooling water at a temperature of 22° and this in such a quantity that the cooling water at the base of the washing compartment 1 has a temperature of 40° C. To the preliminary cooling stage a portion of this cooling water preheated to 40° is led forward. In the preliminary cooling stage the cooling water meets the gas with a temperature of 70° resulting in a cooling down of the gas to about 56° and the heating up of the cooling water to about 60° C.

The cooling water with a temperature of 60° then goes forward to the air saturator to which from below air is led forward at a temperature of 15°, effecting the heating up of the air to 50°. The temperature of the water is thereby reduced from 60 to 40°. The cooling water running off direct from the washing compartment 1 and that from the air saturator 3 is cleaned in the clarifying tank and then cooled in the tubular cooler back to 22°, whereupon it is used over again in the circulation for the final cooling of the gas in the washing compartment 1. The water removed by the saturation of the combustion air from the cooling fluid is replaced by a supply of fresh water to the cooling water in the clarifying tank.

The invention as hereinabove set forth is embodied in a particular form of construction, but may be variously embodied within the scope of the claim hereinafter made.

I claim:

A process for direct cooling and washing of producer gas or the like from producers employing air saturated with steam for gas making which comprises: bringing producer gas while hot from a producer into contact in a final cooling stage with cold water sufficient for finally cooling the same to the required final temperature and thereby preheating the water; separating a portion of the spent cooling water from said stage and bringing only the separated part while so preheated into contact in a preliminary cooling stage with the producer gas passing to the final cooling stage and before the gas is cooled and thereby preliminarily cooling the gas in the preliminary cooling stage and further heating the separated part only of the spent water from final cooling stage to a temperature above that which would obtain were all of the cooling water from the final cooling stage used to preliminarily cool the gas to the same degree in the preliminary cooling stage; thereafter bringing the spent water from the preliminary gas-cooling stage while still hot therefrom into direct contact in an air saturation stage with the air required for gas making in a gas producer and thereby increasing the saturation of the air during such direct contact with the aid of the heat abstracted from the gas in the gas cooling stages over that which would obtain with saturation by means of all of the water from the final cooling stage; cooling the remaining part of spent water from final cooling stage and the spent water from the air saturation stage; and recirculating the so cooled water through the final gas cooling stage.

CONRAD HAHN.